Sept. 13, 1960

C. O. FINN 2,952,493

BEATER AND FEEDER FOR AUTOMATICALLY CONTROLLING DELIVERY
OF MULCH FIBRES TO A BLOWER

Filed Feb. 27, 1959

INVENTOR.
Charles O. Finn
BY Gerald B. Tjoflat
His Attorney

Sept. 13, 1960 C. O. FINN 2,952,493
BEATER AND FEEDER FOR AUTOMATICALLY CONTROLLING DELIVERY
OF MULCH FIBRES TO A BLOWER
Filed Feb. 27, 1959 2 Sheets-Sheet 2

INVENTOR.
Charles O. Finn
BY Gerald B. Tjoflat
His Attorney

2,952,493

BEATER AND FEEDER FOR AUTOMATICALLY CONTROLLING DELIVERY OF MULCH FIBRES TO A BLOWER

Charles O. Finn, Cincinnati, Ohio, assignor to The Finn Equipment Company, Cincinnati, Ohio, a corporation of Ohio Filed Feb. 27, 1959, Ser. No. 795,959

8 Claims. (Cl. 302—37)

This invention relates to mulch blowers and more particularly to beater-feeders for separating and feeding such fibres to the intake of the blower. This application is a continuation-in-part of my copending application Serial No. 740,281, filed June 6, 1958, and constitutes an improvement of the same.

Mulch blowers or spreaders, as heretofore constructed, have been provided with rigid beater and feeder bars mounted on rotating shafts. When mulch fibres, usually in the form of bales of straw, hay and the like, were dry and easily separated, the blowers operated without too much difficulty and without excessive plugging at the inlet to the blowers; but when the mulch bales were wet, as was often the case, there was a decided tendency to plugging. Consequently, the mulch was not uniformly discharged by such blowers. Oftentimes, the mulch was blown out in intermittent clumps or bunches. Consequently, the mulch, as deposited on the soil areas, was not efficiently and economically distributed and produced an unsightly appearance as well.

Furthermore, plugging at the inlet of a blower results in considerable loss of time because of the frequent stoppages. To unplug the blower, it was necessary to manually clean out the blower inlet and sometimes the impeller housing thereof.

The beater-feeder of my aforesaid application has proved in practice to be a decided improvement over the prior art feeders in that the aforementioned plugging was materially reduced. But even so, with certain types of mulch fibres, plugging did occur as when the mulch was wet and of a tough variety.

The beater-feeder herein disclosed, is provided with means whereby clumps of mulch which, if permitted to pass to the blower intake, would plug the blower, are intercepted and redirected into the paths of the beaters and subjected to further separating action thereby before feeding them into the blower. The fibres of the clumps are thus so thoroughly separated that they can be accepted by the blower without its being plugged at the intake.

An object of this invention is to provide a beater-feeder for mulch blowers that avoids plugging and which automatically stops feeding when mulch accumulates beyond a certain amount in the blower inlet, and which is provided with means for intercepting clumps of mulch fibres which are capable of plugging the blower, and subjecting such clumps to further separating action of the beaters before feeding them into the intake of the blower.

A further object is to provide the beater and feeder shafts of mulch blowers with flexible beater-feeder elements and with interceptors and direction changers at the discharge side of the feeder but in advance of the blower intake, whereby clumps are arrested and redirected into the path of the flexible beater-feeder members for further separation of the fibres. Thus, the feeding of clumps is prevented for all practical purposes and the rate of feeding of mulches automatically regulated by the resistance to which the beater-feeder elements are subjected by the separated fibres at the entrance to the blower.

The foregoing and other objects will be apparent to those of ordinary skill in the art to which the invention pertains from the following description taken in conjunction with the accompanying drawings.

Figure 1:
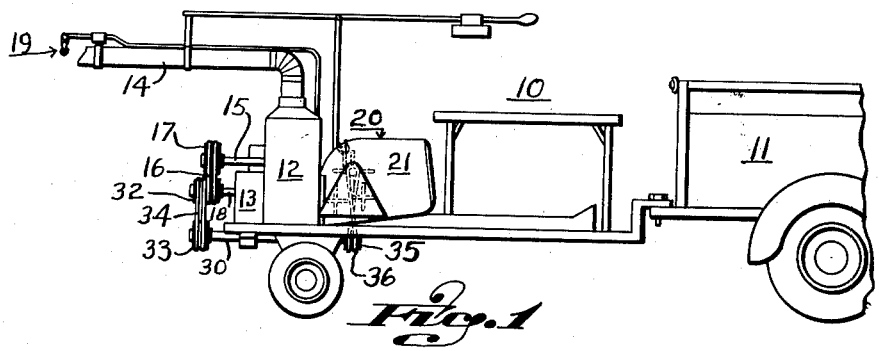
Figure 1 is a more or less schematic view of a mulch spreader provided with a beater-feeder arranged and constructed in accordance with an embodiment of the invention.

In Fig. 1 of the drawings a mulch spreader 10 is shown in more or less schematic form. It may be coupled to a truck 11 or other vehicle and pulled along a course, a roadside for example, or over a field, or wherever it is desired to cover soil with mulch.

The mulch spreader 10 may be of the type shown and used for the purposes stated in my Patent No. 2,842,897, granted July 15, 1958, and provided with a nozzle attachment such as shown in my Patent No. 2,844,914, granted July 29, 1958, for Coating Mulch Fibres With Adhesive as They Are Discharged Into the Air.

The mulch spreader comprises a blower 12 driven by a suitable motor or engine 13. The blower discharges into a swingable spreader or blower pipe 14. The impeller shaft 15 of the blower is driven by belts 16 running on pulleys 17 and 18 secured to the impeller and motor shafts respectively.

The pipe 14 may be raised or lowered and swung from side to side manually to give direction to the mulch discharging therefrom. At or near the discharge end of the pipe 14 is a means 19 for spraying an adhesive into the air stream by which the mulch is carried thereby, spotting the fibres with adhesive and causing them to adhere one to another when they come to rest on the ground. The means 19 may be of the form and construction illustrated in my aforementioned Patent No. 2,844,914.

The mulch may consist of baled straw, hay or other fibre, including peanut vines. The fibres used are usually determined by the particular type of mulch available in the locality where the mulching is to be done. The delivery of the separated fibres to the blower intake in a non-plugging condition is therefore a matter of concern. Unless the mulch fibres are thoroughly separated before they enter the blower, plugging is sure to follow.

The bales of fibre are delivered manually to a beater-feeder 20 in which the fibres are separated and fed to the intake of the blower. The beater-feeder should not cut the fibres into short pieces, because the longer the fibres are the better they adhere when deposited on the ground. Heretofore, such beater-feeder devices utilized solid, rigid beater and feeder bars. They operated quite satisfactorily at times, provided the fibres were sufficiently dry to be readily and uniformly separated. But, as those beater and feeder bars were rigid, they continued to beat and attempted to feed at the same rate even though the blower intake was quite plugged or overloaded, thereby aggravating the plugged condition. Consequently, the mulch spreader would have to be stopped and the blower intake, and sometimes the blower housing itself, cleaned out by hand. Even before plugging was complete, the fibres were often as not fed in clumps or slugs and discharged in that form by the blower pipe. Therefore, the fibres were not uniformly distributed over the soil areas which resulted in inefficient and uneconomical use of the fibres. In addition, the mulched areas were rendered unsightly by these clumps until they had been settled down by repeated rains.

The beater-feeder 20 of this invention is automatic in its feeding and beating operation. As soon as fibre accumulates beyond a certain amount at the blower intake, the feeding rate is decreased automatically and under certain conditions arrested until the blower intake has been cleared. As the intake clears out, feeding of fibre resumes automatically.

In addition, the beater-feeder 20 is provided with means for intercepting unseparated clumps and redirecting them into the path of feeder-beaters and subjected to such further separating action that the fibres will have been substantially completely separated, or so sufficiently separated, that the blower intake can accept them without danger of plugging.

Figure 2:
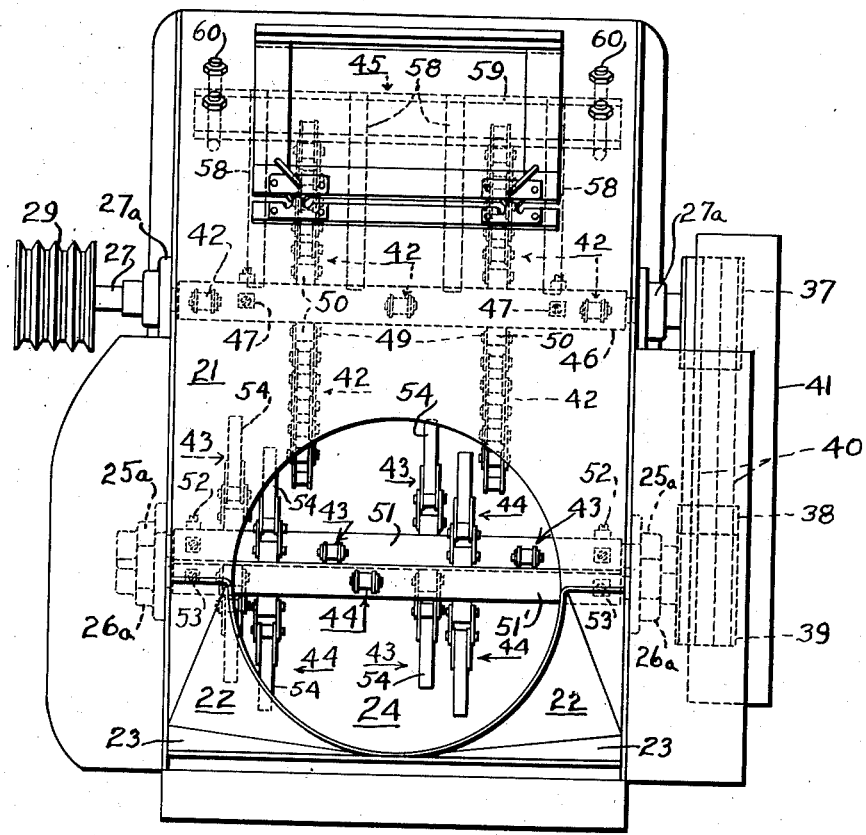
Fig. 2 is an enlarged view in elevation of the discharge end of the beater-feeder of Fig. 1.
Figure 3:
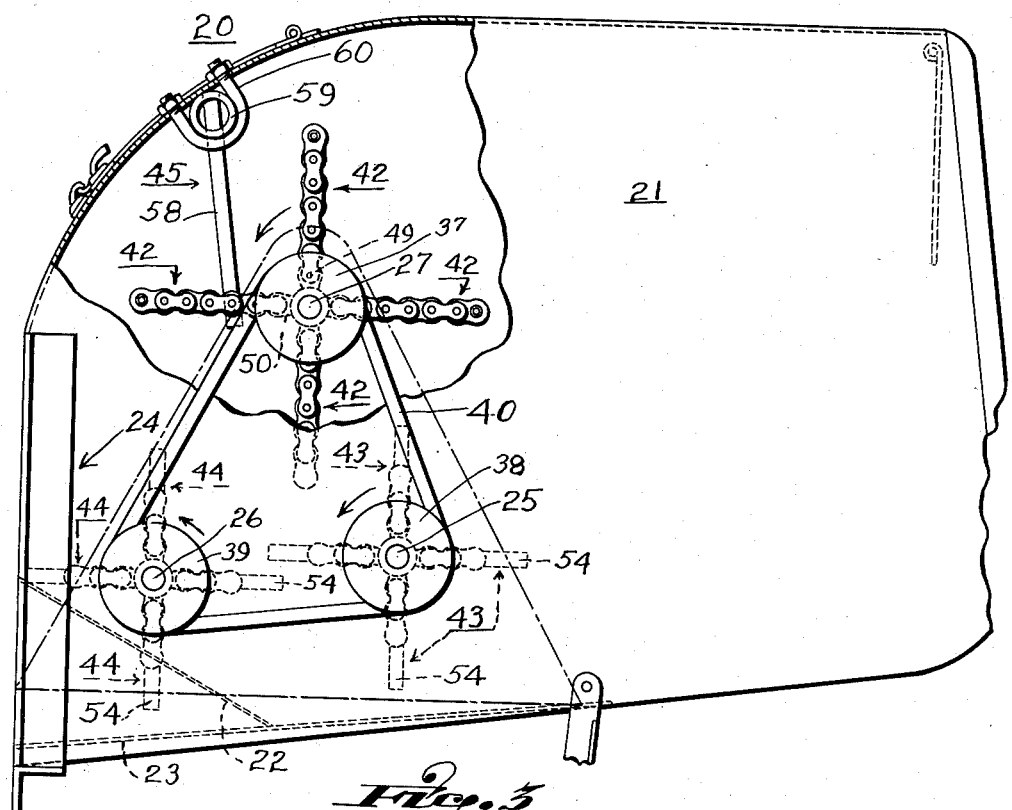
Fig. 3 is a view in side elevation of the beater-feeder shown in Fig. 2.
Figure 4:
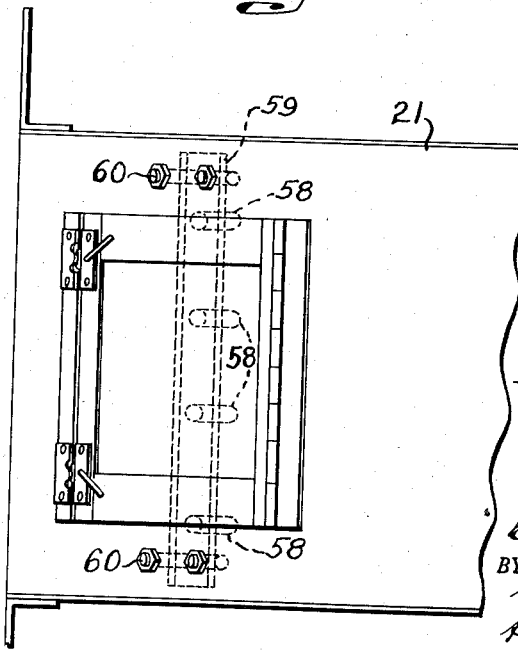
Fig. 4 is a fragmentary top plan view of Fig. 3.

Device 20 is shown to an enlarged scale in Figs. 2 and 3. It comprises a housing 21 having at its discharge end a throat formed by side plates 22 and a bottom plate 23 that converge towards and terminate at the edge of the inlet 24 of the blower 12. The housing supports transversely extending shafts 25, 26 and 27 which are journaled in bearings 25a, 26a and 27a, respectively, carried by the side walls of the housing. As arranged, the ends of the shafts are located at the corners of a triangle.

The shaft 27 is provided with a pulley 29 driven by the motor shaft through a jack shaft 30. As shown, in Fig. 1, the drive from the motor to the jack shaft 30 is by means of pulleys 32 and 33 and a belt 34, and from the jack shaft to pulley 29 by means of a pulley 35 and a belt 36. The opposite end of shaft 27 and the corresponding ends of shafts 25 and 26 are provided with pulleys 37, 38 and 39, respectively, over which a belt 40 runs. The pulleys and belt may be enclosed by a guard 41. Thus, the shafts 25—27 are driven in the same direction as indicated by the arrows in Fig. 3.

The respective shafts 25—27 are provided with a plurality of flexible members 42, 43, and 44, respectively. The members 43 and 44 preferably are of identical construction, as shown, and are held in operative position, that is, at substantially right angles to their respective shafts, by centrifugal force. When mulch accumulates at the blower inlet, or the bales of mulch are quite hard or wet, these beater-feeder members bend or deflect. The amount of bending or deflection is proportional to the resistance offered at contact with the mulch fibres at any given rotational speed of the shafts on which they are mounted.

In order to make certain that unseparated clumps, which, if allowed to pass into the intake of the blower, might plug the same, are intercepted and subjected to further separating action of the beater-feeder elements, an intercepter and direction change means 45 is provided. The means 45 is located between the blower inlet 24 and the upper beater shaft 27 in a position to intercept any unseparated clumps of fibres that have been thrown into the upper part of the housing by the beater-feeder elements on shafts 42 and 43, and to some extent by the beaters 44, and redirected into the path of the beater-feeder elements 43 and 44 by which the clumps are finally so thoroughly separated that they may pass on to the intake of the blower without plugging the blower intake.

Thus, the beater-feeder is designed to separate all clumps of fibres and at the same time automatically regulate the rate at which separated fibres are delivered to the intake of the blower.

Members 42 are arranged in diametrically opposed pairs, there being five such pairs on shaft 27. They may be secured to a sleeve 46 through which shaft 27 extends and to which the sleeve is secured in any suitable manner, as by means of set screws 47. The flexible members 42 are preferably composed of lengths of standard chain, such as roller chain for example, as the latter are strong and durable and the links are relatively freely rotatable on their connecting link pins. These links of chain are attached by means of pins 49 to lugs 50 that may be welded or otherwise suitably secured to sleeve 46.

The flexible members 43 and 44 are connected to sleeves 51 and 51' through which the respective shafts 25 and 26 extend and to which they may be secured in any suitable manner as by means of set screws 52 and 53, respectively.

The shafts 25 and 26 being relatively close to the bottom of the housing, the members 43 and 44 are shorter than members 42 and of slightly different construction. Each of the members 43 comprises several links of chain, preferably roller chain, for reasons stated supra, and a relatively short, rigid bar 54 which is pin-connected to the outermost link. Each of the innermost links is attached by means of a pin 55 to a lug 56 secured as by welding or other suitable means to the sleeve 51.

The flexible members 43 are arranged in diametrically opposed pairs, there being four pairs so spaced along the shaft as to clear the members 42 and 44, see Fig. 2.

The flexible members 44 are also arranged in diametrically opposed pairs on their sleeve 51', there being three such pairs as shown. Members 44 are also provided with bars at their outer ends as indicated at 54'. Adjacent pairs of members 43 and 44 are relatively close to each other and the outermost pairs of members 44 are relatively close to the outermost pairs of members 42. The arrangement of the spacing of members 42—44 may be modified to suit requirements and need not necessarily be arranged precisely as shown. Furthermore, there may be a greater or lesser number of flexible members on each of the rotating shafts according to the size of the machine in which they are used.

The shafts on members 42—44 are mounted to rotate in the direction indicated by the arrows in Fig. 3. So long as they do not meet with any substantial resistance, they are maintained by centrifugal force at substantially right angles to their respective shafts. If separated fibres accumulate faster at the intake 24 than the blower suction can take them away, the flexible members 44 deflect and foreshorten, thereby decreasing the rate of feed. Likewise, if the bales are tough and hard, the members on shafts 25 and 27 deflect and adjust to their load capacity. Likewise, the accumulation of fibres between the members 42 and 43 will cause them to deflect and decrease their ability to advance fibres to the blower intake. Thus, by decreasing the rate of feed to the blower intake, the blower can work on the accumulation and deliver to the pipe 14, thus unloading the blower. As the accumulation at the intake increases, the resistance confronted by any or all of the flexible members 42—44 decreases, the centrifugal force causes them to automatically resume beating and feeding at a higher rate.

The means 45 further improves the fibre separating action of the beater-feeder. It comprises a plurality of fingers 58 mounted to a shaft, such as a hollow pipe 59 carried by U-bolt clamps 60. The clamps 60 provide a means for rotatably or angularly adjusting the fingers 58. As shown in Fig. 3, the lower ends of the fingers 58 extend to a level slightly below the shaft 27 of the upper beater-feeder elements. They are so spaced that the beater-feeder elements pass them without interference.

With the beater-feeder elements rotating in the direction indicated by the arrows in Fig. 3, it will be apparent that any clumps carried over by the upper beater-feeder elements will be arrested by the fingers 58 and carried downwardly into the center of the area bounded by the three rotating shafts. When the clumps reach this area, they are again worked on by the beater-feeder elements 43 and 44 and loosened and separated to such extent that they can pass freely to the intake of the blower.

By means of the fingers 58 and the flexible beater-feeders on the three rotating shafts, mulch fibre is separated efficiently and thoroughly and clumping is substantially completely eliminated. Thus, by this means, mulch fibre can be efficiently and economically utilized and uniformly spread over soil areas where they are tacked down by the adhesive above mentioned to form a uniform, protective cover for soil areas whether seeded or not.

Having thus described the invention, it will be apparent to those of ordinary skill in the art to which the invention pertains, that various modifications and changes may be made in the illustrated embodiment without departing from either the spirit or the scope of the invention.

Therefore, what is claimed as new and desired to be secured by Letters Patent is:

1. A beater-feeder for mulch blowers adapted for mounting at the inlet of a blower, said beater-feeder comprising a housing having an inlet for bales of fibre and an outlet for separated fibres a plurality of spaced shafts rotatably mounted in the housing and flexible members secured by one end to said shafts so that the other ends are free, the flexible members on one shaft being offset with reference to flexible members on other shafts so that they pass each other when the shafts are rotating, means for driving the shafts in unison in the same direction, said flexible members being normally held substantially at right angles to their respective shafts by centrifugal force and being deflected by the accumulation of mulch at the housing outlet thereby rendering them relatively non-feeding until the accumulation decreases, and means for intercepting clumps of fibres at a location in advance of said outlet whereby said clumps are acted upon by flexible members of one of said shafts and returned from said location to the space between said shafts and into the paths of flexible members thereon whereby said clumps are subjected to an additional beating and separating action and delivered to said outlet.

2. A beater-feeder as in claim 1 in which two of said shafts are located near the bottom of the housing and another shaft is uppermost and located above the same in a vertical plane between said two shafts, the space to which said clumps are returned being between the uppermost shaft and the other two shafts, the flexible members on certain of said shafts having bars at their outer ends, and in which the intercepting means is disposed between the blower entrance and the flexible members carried by the uppermost of said shafts.

3. A beater-feeder as in claim 1 in which the intercepting means comprises spaced downwardly extending fingers disposed to so coact with the flexible members on one of said shafts that clumps of fibres passing the same are arrested and returned to the space between said shafts to be further acted upon by the flexible members thereon to thereby further beat and separate the fibres of the clumps.

4. A beater-feeder as in claim 2 in which two of said shafts are located near the bottom of the housing and another shaft is located above the same and in a vertical plane between said two shafts, the flexible members of said lowermost shafts having bars at their outer ends and in which the intercepting means comprises spaced downwardly extending fingers disposed to so coact with the flexible members on the uppermost of said shafts that the clumps of fibres passing the same are arrested and returned by the flexible members on the uppermost shaft to a path between the upper and lowermost shafts and into the beating space of the flexible members on all of said shafts.

5. A beater-feeder as in claim 1 in which the flexible members comprise sections of link chain.

6. A beater-feeder as in claim 2 in which the chain is roller chain.

7. A beater-feeder as in claim 1 in which two of said shafts are located near the bottom of the housing and another shaft is located above the same and in a vertical plane passing between and parallel to said shafts, the flexible members comprising sections of roller chain, the free ends of the flexible members on the lowermost shafts having bars at their outer ends, and in which the intercepting means comprises spaced downwardly extending fingers disposed to so coact with the flexible members on the uppermost of said shafts that clumps of fibres passing the same are arrested and returned by the flexible members or the uppermost shaft into the paths of flexible members on the other shafts, the fingers of said arresting means being adjustable towards and away from said uppermost flexible members.

8. A beater-feeder adapted for mounting at the intake of a blower and to deliver fibres thereto in separated condition at a rate that is automatically controlled by the resistance of the fibres to separation and to the resistance of an accumulation of fibres at the blower intake, said beater-feeder comprising a housing having an inlet for fibres to be separated and an outlet for delivery of fibres to the blower, a plurality of shafts which are rotatable in unison in the same direction, said shafts being supported by the housing and extending transversely thereof and being so spaced and located that the ends thereof form the corners of a triangle, two of said shafts being located below the other, said shafts having mounted thereon spaced, flexible members that are urged to maximum feeding and beating position by centrifugal force and which automatically foreshorten as the flexible members meet with the resistance of fibres accumulating at the housing outlet, and means for intercepting and arresting clumps of fibres passing the uppermost shaft at a location in advance of the housing outlet from which location said clumps are returned to the space between the upper and lowermost shafts so as to be subjected to such further beating and separating action as to cause them to pass through said intercepter to the housing outlet.

References Cited in the file of this patent
UNITED STATES PATENTS

| | | |
|---|---|---|
| 1,500,581 | Filson | July 8, 1924 |
| 2,573,227 | Sheeley | Oct. 30, 1951 |
| 2,721,767 | Kropp | Oct. 25, 1955 |
| 2,739,846 | Jacobsen | Mar. 27, 1956 |